United States Patent Office 2,749,306
Patented June 5, 1956

2,749,306

METHOD FOR TREATING CATION EXCHANGE MATERIAL AND CATION EXCHANGE MATERIAL RESULTING THEREFROM

William B. Coleman, Crete, Ill., assignor to Victor Chemical Works, a corporation of Illinois No Drawing. Application May 3, 1952, Serial No. 286,017

6 Claims. (Cl. 210—24)

This invention relates to the treatment of water softening ion exchange materials and relates particularly to the regeneration thereof, the treatment of these materials to remove iron salt deposits and a cation exchange material for use in softening water containing iron salts treated by contact with an essentially brine-free aqueous solution of an alkali metal phosphate salt.

Cation exchange media are well known for their ability to exchange the calcium and magnesium ions of hard waters for the sodium ions of the ion exchange material. Advantage is made of this characteristic to soften water both commercially and in household use. Such ion exchange material may be manufactured or natural zeolites, or greensands, which are regarded as having the general formula, $Na_2O.R_2O_3.nSiO_2.xH_2O$ in which R is iron or aluminum, $n$ is five or more, and $x$ may vary. For example Decalso, is a nearly white precipitated manufactured zeolite. Various synthetic ion exchange media are also available under a variety of trade names. An example of this type is "Amberlite IR-100H," a phenol-formaldehyde cation exchange resin. For purposes of this invention, however, the term ion exchange material will be defined as any such material of the cation exchange type which is capable of exchanging calcium, magnesium and similar ions, particularly from hard water, for sodium ions.

In the past ion exchange material of this type has typically been regenerated using saturated or nearly saturated solutions of common salt. This method has never been entirely satisfactory for a number of reasons. In waters containing iron the ion exchange material tends to become fouled with a slimy deposit which appears to be essentially ferric hydroxide or hydrous ferric oxide. Ordinary regeneration with salt brine does not remove this deposit. In fact successive regenerations tend to increase its tenacity since the deposit is apparently slowly dehydrated to form the hard scaly ferric oxide. Consequently the exchange capacity of the ion exchange material constantly decreases until eventually it must be discarded.

Another undesirable result of the salt brine method is that small particles of the undesirable iron deposits often break loose and enter the treated water supply. Besides making the water unpalatable, these iron specks produce poor laundering results both commercially and in home washings.

The salt brine of the type used in the old method is exceedingly corrosive to metal equipment with which it comes in contact. For instance a saturated salt solution is approximately ten times as corrosive to steel as a 6% solution of sodium tripolyphosphate. Therefore costly repairs are often necessary in installations using salt as the regenerant material. This disadvantage is overcome by the method of this invention.

It is also known that various methods and a variety of compounds have been used in an attempt to remove the iron scale not removed by plain brine regeneration and thereby to reactivate the ion exchange material. These prior methods, however, have several disadvantages. Foremost is the fact that an extra treatment is involved which results in further loss of use of the facilities. Also the special compounds used are generally quite expensive which adds considerably to the ultimate cost of the treated water. These compounds are usually highly alkaline and often attack the exchange material while removing the iron deposits. Finally, however, the efficiency of the ion exchange material is never fully recovered by this intermittent reactivation so that in time the material must be discarded anyway.

By employing the methods and materials of this invention these disadvantages may be overcome; the iron deposits removed; and the ion exchange material regenerated to its original capacity in one simple operation. Thus I have discovered that alkali metal phosphates are very useful for the regeneration of the ion exchange material. I have found the alkali metal pyro, poly and metaphosphates and acid phosphates or various mixtures of the same to be especially suitable for the purpose. The compounds which I prefer to use are the alkali metal tripolyphosphates or pyrophosphates. Of these the preferred compounds are sodium tripolyphosphate and sodium acid pyrophosphate either singly or in various mixtures.

Experimental tests have shown that the phosphates which are useful in treating or regenerating the ion exchange materials are water soluble phosphates which are capable of sequestering iron ions in solution and which have a pH of about 4.0 to about 10.5 in solution. In order to be workable both these characteristics must be present. These conditions are necessary in order to remove the iron deposits from the exchange material in the manner explained above. Furthermore the pH range is important in order that the treating solution will not unduly attack the ion exchange materials, such as the zeolite. For example, a trisodium phosphate which has a pH in solution of 11.8 is too alkaline and attacks the zeolite. Tetrasodium pyrophosphate which has a pH of 10.2 is a good sequestering agent and produces satisfactory results. Sodium tripolyphosphate which has a pH of 9.6 is excellent in all respects as a regenerating material. Disodium phosphate on the other hand which has a pH of 9.0 lacks the desired sequestering power although it is within the required pH range. Monosodium phosphate which has a pH of 4.6 is workable in contrast to the other orthophosphates which are generally less satisfactory. This compound appears to work because of its high acidity in conjunction with the dispersing power of the phosphate ion as it probably slowly dissolves ferric hydroxide from the ion exchange material. Sodium acid pyrophosphate having a pH of 4.2 produces excellent results. Sodium metaphosphate having a pH of about 6.5 proves satisfactory.

Although the pH may be as high as about 10.5, as explained above, the preferred upper limit is between about 8.2 and about 9.5. However as pointed out above, solutions of phosphates with pHs at the upper limit of the ranges are satisfactory.

The treating solutions comprising the phosphates should be substantially salt free. If salt is present, there is an apparent incompatibility which results in the deposit of a crystalline coating on the ion exchange material. Thus where a solution containing 3.3% salt (sodium chloride) and 3.3% sodium tripolyphosphate is used, crystals were immediately deposited on the ion exchange material and interfered with the regeneration. Similarly, when a solution containing 6.6% salt and only 0.25% of the tripolyphosphate were used, crystalline coatings were again deposited. In each of these tests the ion exchange material was zeolite.

Where salt solutions are used in the customary regeneration of ion exchange materials. the solutions of this invention should be used intermittently therewith to remove deposited iron salts. Thus it has been found that regeneration with salt followed immediately by contact with an aqueous solution of one of the phosphates produced a clean surfaced ion exchange material. Similarly, an initial treatment of the ion exchange material with a small amount of the phosphate solution before the regular salt regeneration served to prevent or at least materially reduce subsequent deposition of iron salts.

I prefer to use the phosphate material as the sole regenerant, but I have found that various alternative procedures, though generally less satisfactory, are still superior to the usual salt brine method. I have found, for instance, that the occasional substitution of an alkali metal phosphate solution for the customary brine solution has beneficial effects on the ion exchange material. To a certain extent it will remove prior iron deposits and at the same time afford some protection against subsequent iron deposition. This discovery makes it possible to make the first regeneration with an alkali metal phosphate solution followed by a number of brine regenerations and then another phosphate regeneration. It is also possible to remove some of the iron scale, and thereby regain some of the exchange capacity, from an exchange material which previously had been regenerated entirely with salt brine. None of these alternative methods, however, is as satisfactory as my preferred method of making all regenerations with an alkali metal phosphate solution.

Any strength solution of these alkali metal phosphates may be used successfully in carrying out the invention. It will be obvious, however, that using extremely weak solutions, say 1%, will result in wasting time or that the use of strong solutions near the saturation point may result in undesirable precipitation. I have found that solution strengths of the phosphates in the range of 2-15% by weight are preferred.

The following examples are included to show the operation of the invention, but are not intended to be limiting in any way as various modifications will be obvious.

*Example 1.*—Two ten-gram samples of Decalso, a nearly white precipitated synthetic zeolite widely used in household water softeners, were placed in beakers and each was contacted with one liter of a natural hard water containing some iron and having a total hardness of approximately 750 p. p. m. After an interval of contact during which the hardness was removed, the water was decanted. The first sample was then regenerated by allowing it to stand in contact with 40 cc. of a saturated salt solution. The second sample was similarly regenerated except that 40 cc. of a 6% solution of sodium tripolyphosphate was used in place of the salt solutions. Following regeneration the Decalso was rinsed with distilled water. This complete cycle was repeated sixty-three times in all. Early in the process the salt regenerated zeolite sample began to turn yellowish and at the end of the test the sample was rust colored. The sample which was regenerated with sodium tripolyphosphate was the same white color as the original Decalso. This test represents approximately thirty-one months of use for a household water softener receiving bimonthly regeneration.

Following the completion of the test the two samples of Decalso were analyzed for iron. The sample regenerated with salt contained 0.40% iron whereas the sample regenerated with sodium tripolyphosphate contained only 0.14% iron which is equivalent to the 0.13% found in the original material. Thus it can be seen that the regeneration with sodium tripolyphosphate effectively prevented fouling of the Decalso while regeneration with salt brine resulted in a decided buildup of iron deposits.

*Example 2.*—Two ten-gram samples of Decalso were treated five consecutive times with one liter of a synthetic hard water containing 500 p. p. m. of ferrous sulfate. This water was used in place of the natural water of Example 1 in order to hasten the deposition of iron. Following each of the first four contacts with this water the Decalso was regenerated with 40 cc. of saturated salt solution. The fifth time one sample was again regenerated with salt solution, but the second sample was regenerated with 40 cc. of a 6% solution of sodium tripolyphosphate. The sample which had been regenerated solely with salt solution had a rusty appearance while the sample receiving a final regeneration with sodium tripolyphosphate had only a faint yellowish cast. This test shows that intermittent treatment with sodium tripolyphosphate is quite effective in controlling the deposition of iron on the exchange material. However, intermittent regeneration with the polyphosphate solution is not as satisfactory as when all regeneration cycles are carried out with the polyphosphate solution.

*Example 3.*—Two ten-gram samples of Decalso were contacted with one liter portions of ferrous sulfate solution and the exchange material regenerated as in Example 2 except that one was regenerated exclusively with a 6% solution of sodium acid pyrophosphate (SAPP). This procedure was repeated fifteen times and iron determinations made after every fifth cycle. The iron contents of the water before and after the treatment were as follows:

|  | Untreated ferrous sulfate water, p. p. m. | After contact with salt regenerated Decalso, p. p. m. | After contact with sodium acid pyrophosphate regenerated Decalso, p. p. m. |
| --- | --- | --- | --- |
| 5th Cycle | 430 | 190 | 120 |
| 10th Cycle | 450 | 265 | 160 |
| 15th Cycle | 450 | 255 | 170 |

At the end of the fifteenth cycle the salt regenerated Decalso was nearly brown in color whereas the sodium acid pyrophosphate regenerated sample was only slightly discolored. This shows that the buildup of iron on the salt regenerated Decalso cuts its efficiency in removing hardness so that subsequently treated water may contain in excess of 50% more iron than water treated with sodium acid pyrophosphate regenerated Decalso.

*Example 4.*—Two ten-gram samples of Decalso were given four complete cycles of contact with ferrous sulfate-containing water and regeneration carried out with salt brine. After contacting with the synthetic hard water for the fifth time one of the samples was regenerated with 6% sodium acid pyrophosphate. Iron determinations similar to those shown in Example 3 gave the following results:

P. p. m.
Water before treatment _____ 460
Water after contact with salt regenerated Decalso ___ 230
Water after contact with sodium acid pyrophosphate regenerated Decalso _____ 170

The sample of Decalso receiving salt regeneration exclusively was a rust brown color whereas the sample regenerated with sodium acid pyrophosphate on the fifth cycle was only slightly discolored. This shows that intermittent treatment with sodium acid pyrophosphate is beneficial in removing iron from the ion exchange material. During two more cycles in which each sample was regenerated with brine the rust color failed to reappear on the sample which had been regenerated once with sodium acid pyrophosphate.

*Example 5.*—Four ten-gram samples of Decalso were treated as in Example 4 for four complete cycles. After the fifth contact with ferrous sulfate water the samples were regenerated with saturated salt solution, 4.5%, 3.0% and 1.5% sodium acid pyrophosphate solutions respectively. All four samples were then given two more cycles with salt regeneration. After the seventh cycle the following iron determinations were made:

| | P. p. m. |
|---|---|
| Untreated ferrous sulfate water | 430 |
| After treatment with salt regenerated Decalso | 190 |
| After treatment with 4.5% sodium acid pyrophosphate regenerated Decalso | 130 |
| After treatment with 3.0% sodium acid pyrophosphate regenerated Decalso | 165 |
| After treatment with 1.5% sodium acid pyrophosphate regenerated Decalso | 175 |

All Decalso samples which had been regenerated with sodium acid pyrophosphate after the fifth cycle were noticeably less contaminated with iron than the sample which was regenerated with salt solution for all seven cycles. Even the 1.5% sodium acid pyrophosphate solution gave better results than the salt brine.

*Example 6.*—An experiment similar to Example 4 was run in which a 6% solution of equal parts of sodium acid pyrophosphate and tetrasodium pyrophosphate was used in place of the sodium acid pyrophosphate solution. Results showed this phosphate mixture to be satisfactory both as a regenerant and as an iron removal agent.

*Example 7.*—A test similar to Example 6 was run in which the 6% solution consisted of 75% sodium tripolyphosphate and 25% sodium acid pyrophosphate. At the end of ten complete cycles the phosphate regenerant was more efficient than the standard brine regenerant.

*Example 8.*—A test similar to Example 7 showed that regeneration with a 6% solution of sodium hexametaphosphate was quite effective in preventing the deposition of iron on the exchange material.

*Example 9.*—A test similar to Example 1 was run in which Amberlite IR-100H, a synthetic phenol-formaldehyde cation exchange resin, was used as the ion exchange medium. The sample regenerated with sodium tripolyphosphate gave better analytical results through twenty-five complete regeneration cycles as shown by the following data.

| Cycle | Iron in untreated ferrous sulfate water | Iron in water after salt regeneration | Iron in water after sodium tripolyphosphate regeneration |
|---|---|---|---|
| 5th | App. 390 p. p. m. | 175 | 155 |
| 10th | App. 390 p. p. m. | 165 | 150 |
| 15th | App. 390 p. p. m. | 175 | 165 |
| 20th | App. 390 p. p. m. | 180 | 150 |
| 25th | App. 390 p. p. m. | 160 | 150 |

Certain of the tests given in the above examples indicate that the ion exchange material is altered in some manner by the described phosphate treatment. Thus rust colored material that has become discolored through repeated brine regenerations can be regenerated with phosphate and cleaned at least to a major extent. Then during subsequent salt regeneration cycles the treated material remains relatively clear and the rust color returns only reluctantly even during a relatively large number of salt regenerations. Because of this delayed discoloration following phosphate treatment, the ion exchange material has obviously been changed in some manner that is not now thoroughly understood. Similarly, when the ion exchange material is treated with the phosphate solution prior to use in softening water followed by brine regeneration, discoloration is much slower than with similar materials that have not been phosphate treated.

The phosphates disclosed and claimed herein are capable of sequestering ferric ions in solution. Thus the term sequestering is used to indicate that chemical combinations are formed with the ferric ions so that the usual precipitation reactions of these ions are apparently no longer possible or are at least inhibited. Thus the ions are at least partially prevented from exhibiting their usual properties due to the close combination with the phosphate.

The foregoing detailed description is given for clearness of understanding only, and no unnecessary limitations should be understood therefrom as modifications will be obvious to those skilled in the art.

I claim:

1. The method of treating a water softening ion exchange material to remove iron salts deposits thereon which comprises contacting the material with an essentially brine-free water solution of a phosphate salt, wherein the phosphate salt is a member of the class consisting of alkali metal pyrophosphates, alkali metal polyphosphates, alkali metal metaphosphates, acid phosphates and mixtures thereof, whose metal ion is to be substituted in the exchange material, the phosphate being capable of sequestering ferric ions and having a pH of about 4.0 to about 10.5.

2. The method of claim 1 wherein the phosphate is sodium tripolyphosphate.

3. The method of claim 1 wherein the phosphate is sodium acid pyrophosphate.

4. In the softening of hard water containing iron salts wherein the water is contacted with a water softening ion exchange material, the method which comprises regenerating the material by contacting it with an essentially brine-free water solution of an alkali metal phosphate from the class consisting of alkali metal pyrophosphates, alkali metal polyphosphates, alkali metal metaphosphates, acid phosphates and mixtures thereof, wherein the phosphate is capable of sequestering ferric ions and has a pH of about 4.0 to about 10.5.

5. In the softening of hard water containing iron salts wherein the water is contacted with a water softening ion exchange material and the material is periodically regenerated with aqueous alkali metal chlorides solutions, the method which comprises intermittently regenerating and cleaning said material by contacting it with an essentially brine-free water solution of an alkali metal phosphate from the class consisting of alkali metal pyrophosphates, alkali metal polyphosphates, alkali metal metaphosphates, acid phosphates and mixtures thereof, the phosphate being capable of sequestering ferric ions that are deposited on the ion exchange material and having a pH of about 4.0 to about 10.5.

6. A cation exchange material for use in softening water containing iron salts treated by contact with an essentially brine-free aqueous solution of an alkali metal phosphate salt, wherein the phosphate salt is a member of the class consisting of alkali metal pyrophosphates, alkali metal polyphosphates, alkali metal metaphosphates, acid phosphates and mixtures thereof, whose metal ion is to be substituted in the exchange material, said phosphate being capable of sequestering ferric ions and having a pH of about 4.0 to about 10.5.

References Cited in the file of this patent

UNITED STATES PATENTS

| 1,965,339 | Hall | July 3, 1934 |
| 2,351,160 | Stone et al. | June 13, 1944 |